(12) United States Patent
Takasu et al.

(10) Patent No.: US 9,342,264 B2
(45) Date of Patent: May 17, 2016

(54) CONTROL SYSTEM, CONTROL METHOD OF A CONTROL SYSTEM, AND RECORDING DEVICE

(71) Applicant: Seiko Epson Corporation, Tokyo (JP)

(72) Inventors: Kazuhiro Takasu, Shiojiri (JP); Koichiro Tsutsumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/375,051

(22) PCT Filed: Mar. 1, 2013

(86) PCT No.: PCT/JP2013/001284
§ 371 (c)(1),
(2) Date: Jul. 28, 2014

(87) PCT Pub. No.: WO2013/132809
PCT Pub. Date: Sep. 12, 2013

(65) Prior Publication Data
US 2015/0002896 A1 Jan. 1, 2015

(30) Foreign Application Priority Data

Mar. 5, 2012 (JP) .................. 2012-048496
Jun. 7, 2012 (JP) .................. 2012-129446

(51) Int. Cl.
G06F 3/12 (2006.01)
G06K 15/00 (2006.01)
G07G 1/00 (2006.01)
G07G 1/14 (2006.01)
G06Q 20/20 (2012.01)
G06K 17/00 (2006.01)

(52) U.S. Cl.
CPC ............ *G06F 3/1279* (2013.01); *G06F 3/1209* (2013.01); *G06F 3/1228* (2013.01); *G06K 17/00* (2013.01); *G06Q 20/202* (2013.01); *G06Q 20/209* (2013.01); *G07G 1/0045* (2013.01); *G07G 1/14* (2013.01)

(58) Field of Classification Search
None
See application file for complete search history.

(56) References Cited

U.S. PATENT DOCUMENTS

| 6,813,650 B1 | 11/2004 | Cato et al. | |
| 2004/0177004 A1* | 9/2004 | Mueller et al. | 705/15 |
| 2007/0005685 A1 | 1/2007 | Chau et al. | |
| 2008/0114678 A1 | 5/2008 | Bennett et al. | |
| 2008/0182639 A1 | 7/2008 | Antonopoulos et al. | |
| 2011/0010256 A1* | 1/2011 | Yoshimoto | 705/23 |

(Continued)

FOREIGN PATENT DOCUMENTS

| EP | 2 590 084 A1 | 5/2013 |
| JP | 05-073869 | 3/1993 |

(Continued)

OTHER PUBLICATIONS

Wikipedia "Point of sale" (Internet Article), Feb. 21, 2012, (pp. 1-6).

(Continued)

*Primary Examiner* — Huo Long Chen

(57) ABSTRACT

A control system 1 has an input device that reads and outputs input information, a printer 11 connected to the input device, and a tablet device 10 connected to the printer 11. When input information is output from the input device, the printer 11 identifies the input device of the input source, and outputs the input information to the tablet device 10.

8 Claims, 7 Drawing Sheets

(56) References Cited

U.S. PATENT DOCUMENTS

| | | | |
|---|---|---|---|
| 2011/0231272 A1 | 9/2011 | Englund et al. | |
| 2011/0307342 A1 | 12/2011 | Haji | |
| 2012/0030001 A1* | 2/2012 | Takeuchi | 705/14.35 |

FOREIGN PATENT DOCUMENTS

| | | |
|---|---|---|
| JP | 2003-513351 | 4/2003 |
| JP | 2004-110205 | 4/2004 |
| JP | 2004-164195 | 6/2004 |
| JP | 2005-084759 A | 3/2005 |
| JP | 2005-242517 | 9/2005 |
| JP | 2006-185399 | 7/2006 |
| JP | 2006-287413 | 10/2006 |
| JP | 2007-087169 | 4/2007 |
| JP | 2008-299633 A | 12/2008 |
| JP | 2009-093290 | 4/2009 |
| JP | 2009-217699 A | 9/2009 |
| JP | 2010-262414 | 11/2010 |
| JP | 2012-014426 | 1/2012 |
| WO | 2007/026531 A1 | 3/2007 |

OTHER PUBLICATIONS

Wikipedia "iPad" (Internet Article), Mar. 4, 2012, (pp. 1-23).

Wikipedia "Tablet computer" (Internet Article), Feb. 27, 2012, (pp. 1-16).

"Event-Driven Architecture", Bruns, Ralf et al, Springer, May 29, 2010, Softwarearchitektur fur ereignisgesteuerte Geschaftsprozesse, (pp. 67-71).

Wikipedia "Event-driven architecture", (Internet Article), Nov. 25, 2015, (pp. 1-5).

"Distributed Systems: Principles and Paradigms", Tanenbaum, Andrew S. et al, (2nd Edition), Oct. 12, 2006, Prentice Hall, (pp. 0-68).

Filter Driver, Internet, Microsoft, Sep. 13, 2010, [Date of Search: Jan. 25, 2016], URL: https://msdn.microsoft.com/ia-jp/library/gg155668%28v=winembedded.70%29.aspx (p. 1-3).

* cited by examiner

CONTROL SYSTEM, CONTROL METHOD OF A CONTROL SYSTEM, AND RECORDING DEVICE

TECHNICAL FIELD

The present invention relates to a control system including a recording device connected to an input device and an information processing device connected to the recording device, to a control method of the control system, and to the recording device.

BACKGROUND

Systems having a POS terminal as a recording device with a barcode input device connected thereto, and a POS controller connected to the recording device, are known from the literature (see, for example, PTL 1). In the system described in PTL 1, the recording device and POS controller work together to execute processes and operate as a POS system. In addition to a printer driver for controlling the recording device, specific applications are generally installed to the POS controller or other information processing device in such systems. Information input from the barcode scanner or other input device is processed by functions of the applications and printer driver.

CITATION LIST

Patent Literature

[PTL 1] JP-A-H05-73769

SUMMARY OF INVENTION

Technical Problem

The system described in PTL 1 also anticipates situations in which a specific application is not installed on the information processing device, and the information processing device accesses a server that provides an application and executes processes using functions of the application on the server. In this event, a generic device having at least the ability to access a server can be used as the information processing device instead of a specialized device with dedicated software or hardware for controlling the recording device, and improved convenience can be expected. If processes appropriate to the input device can be executed while using as few functions of the operating system of the information processing device as possible when information from an input device is input to the information processing device through the recording device in this configuration, different kinds of terminal devices can be used as the information processing device independently of the particular type or version of operating system used by the terminal device. More specifically, the advantages of using a generic device as the information processing device can be effectively utilized.

Barcode scanners and other input devices are used, and a device driver appropriate to each input device is installed to the device to which the input device is connected, in the POS system described in PTL 1. The number of device drivers thus increases as the number or type of input devices increases, and problems managing the device drivers increase accordingly. Generic device drivers could conceivably be used to solve this problem. However, in order to ensure versatility, common generic device drivers treat the controlled devices as the same kind of device. In order to accurately process data related to sales transactions, the POS system must be able to differentiate the input devices that output the output data. Systems such as POS systems must therefore be able to control different input devices appropriately according to the type of device, a device driver must be provided for each particular input device, and there is no advantage in using a generic device driver.

The present invention is directed to the foregoing problem, and an object of the invention is to enable processing appropriate to the input device when there is input from an input device while using as few functions of the operating system of the information processing device as possible.

A further object of the invention is to simplify managing the device drivers controlling the input devices and enable efficiently controlling input devices in a system having a plurality of different types of input devices.

Solution to Problem

To achieve the foregoing object, a control system according to the invention has an input device configured to read and output input information; a recording device configured to, when connected to the input device and the input information is input, determine the input device that output the input information, and output data related to the input information; and an information processing device connected to the recording device and configured to receive the data output by the recording device.

When input information is output from an input device in this configuration, the recording device determines the input device that output the input information, and outputs the input information to the information processing device. The input information can therefore be processed appropriately to the input device without the information processing device determining the input device. As a result, processes appropriate to the input device connected to the recording device can be executed while using as few functions of the operating system of the information processing device as possible.

The control system of the invention preferably also has a server connected to the information processing device through a network; the recording device adds identification information identifying the input device to the data, and outputs to the information processing device; and the information processing device determines the input device based on the identification information contained in the data with the added identification information output by the recording device, and executes a process appropriate to the input device on the data.

When input information is input from the input device in this configuration, the recording device adds identification information identifying the input device of the input source to the input information, and outputs to the information processing device. The information processing device identifies the input device of the input source based on the identification information added to the input information, and executes a process corresponding to the input device of the input source. As a result, the recording device and information processing device can cooperate to identify the input device and run a process corresponding to the input device without using functions of the operating system of the information processing device.

In the control system of the invention, the information processing device could have a display unit configured to display information based on the data; accesses the server, acquires a display file that displays information based on the data, and displays a user interface based on the display file using a web browser; and identifies the input device based on the identification information and executes a process appropriate to the input device by running a program embedded in the display file.

In this configuration, the information processing device uses the ability to acquire a display file for displaying a user interface, and can identify the input device and execute a process appropriate to the input device without using functions of the operating system, by using a function of a program embedded in the display file.

In the control system of the invention, the input device may be a barcode scanner or a card reader.

A barcode scanner and card reader are commonly connected to a recording device in a POS system, product barcodes are read with the barcode scanner and a process based on the read barcode is executed, and cards such as customer cards are read with the card reader and a process based on the read information is executed. By applying the invention to such POS systems, whether the input source of the input information is the barcode scanner or the card reader can be easily determined without using functions of the operating system of the information processing device.

Further alternatively, in another control system according to the invention the information processing device runs a POS application configured to process the data; and the recording device has an input unit that connects to the input device and receives the input information, a control unit configured to run a device driver to generate data based on the input information, to run a filter driver to acquire identification information identifying the input device configured to output the data, and to add the acquired identification information to the data, an output unit configured to output data with the added identification information, and a print unit configured to print, and prints by the print unit as controlled by the information processing device.

In this configuration the input data is produced by the device driver, and the input device corresponding to the input data is determined by the filter driver. Because the input data can therefore be processed based on the type of input device, the input data can be appropriately processed by the control system. Because the device driver also does not need to process data identifying the input device, a generic device driver can be used. Problems managing device drivers can therefore be reduced and input devices can be efficiently controlled.

Further alternatively in a control system according to the invention, the information processing device has a web browser that generates a window based on a web page that runs a POS application, and a display unit configured to display a window generated by the web browser.

In this configuration a web browser based on a web page can be used to run a POS application and process transaction information.

Further alternatively in a control system according to the invention, the input information output by the input device is transaction information; and the POS application processes data related to the transaction information based on the identification information.

In this configuration, the POS application can be run and transaction information processed based on the input information output by the input device.

Further alternatively in a control system according to the invention, the filter driver acquires data satisfying a condition specified by the POS application after the data is produced by the device driver.

In this configuration, the condition related to the input data acquired by the filter driver can be specified by a function of the POS application. As a result, the information processing device and the recording device do not need to have a function for managing the filter driver. A generic device can therefore be used as the information processing device. Furthermore, because the condition used in filter driver operation can be changed by the POS application when different input devices are used for particular tasks, managing the input devices is even easier.

To achieve the foregoing object, a control method of a control system according to the invention includes: an input device reading and outputting input information; and a recording device connected to the input device identifying the input device that output the input information when the input information is input from the input device, and outputting data related to the input information to an information processing device connected to the recording device.

With this configuration, when input information is output from an input device, the recording device determines the input device that output the input information, and outputs the input information to the information processing device. The input information can therefore be processed appropriately to the input device without the information processing device determining the input device. As a result, processes appropriate to the input device connected to the recording device can be executed while using as few functions of the operating system of the information processing device as possible.

In another control method of a control system according to the invention, the recording device adds identification information for the identified input device to the data, and outputs to the information processing device; and the information processing device identifies the input device based on the identification information contained in the data with the added identification information, and processes the data appropriately to the input device.

In this configuration, the recording device adds identification information identifying the input device of the input source to the input information, and outputs to the information processing device. The information processing device identifies the input device of the input source based on the identification information added to the input information, and executes a process corresponding to the input device of the input source. As a result, the recording device and information processing device can cooperate to identify the input device and run a process corresponding to the input device without using functions of the operating system of the information processing device.

In another control method of a control system according to the invention, the input information read by the input device is transaction information; the recording device outputs data produced based on the transaction information to the information processing device; and the information processing device runs a POS application and processes the data produced based on the transaction information.

Further alternatively, data processed by the POS application is output to the recording device; and the recording device prints the data processed by the POS application.

In this configuration the input data is produced by the device driver, and the input device corresponding to the input data is determined by the filter driver. Because the input data can therefore be processed based on the type of input device, the input data can be appropriately processed by the control system. Because the device driver also does not need to process data identifying the input device, a generic device driver can be used. Problems managing device drivers can therefore be reduced and input devices can be efficiently controlled.

To achieve the foregoing object, a recording device according to the invention has an input unit to which input information output from an input device is input; a control unit that produces data based on the input information, and identifies the input device that output the input information; and a transmission unit that transmits the data.

With this configuration, when input information is output from an input device, the recording device determines the input device that output the input information, and outputs the input information to the information processing device. The input information can therefore be processed appropriately to the input device without the information processing device determining the input device. As a result, processes appropriate to the input device connected to the recording device can be executed while using as few functions of the operating system of the information processing device as possible.

In another recording device according to the invention, the control unit adds identification information for the identified input device to the data; and the transmission unit transmits data with the identification information added.

When input information is input from the input device in this configuration, the recording device adds identification information identifying the input device of the input source to the input information, and outputs to the information processing device. Because the input device of the input source can be identified based on the identification information added to the input information, the information processing device can identify the input device and run a process corresponding to the input device without using functions of the operating system of the information processing device.

In another recording device according to the invention, the control unit runs a device driver to generate data based on the input information, and runs a filter driver to identify the input device and acquire identification information.

Because the recording device acquires input data produced by the device driver from the filter driver and identifies the input device corresponding to the input data in this configuration, the information processing device can process the input data based on the type of input device. As a result, input data can be appropriately processed by the POS system. A generic device driver can also be used because there is no need for the device driver to process data identifying the input device. Problems related to managing device drivers can therefore be reduced, and input devices controlled efficiently.

DESCRIPTION OF EMBODIMENTS

Embodiment 1

A preferred embodiment of the present invention is described below with reference to the accompanying figures.

Figure 1:
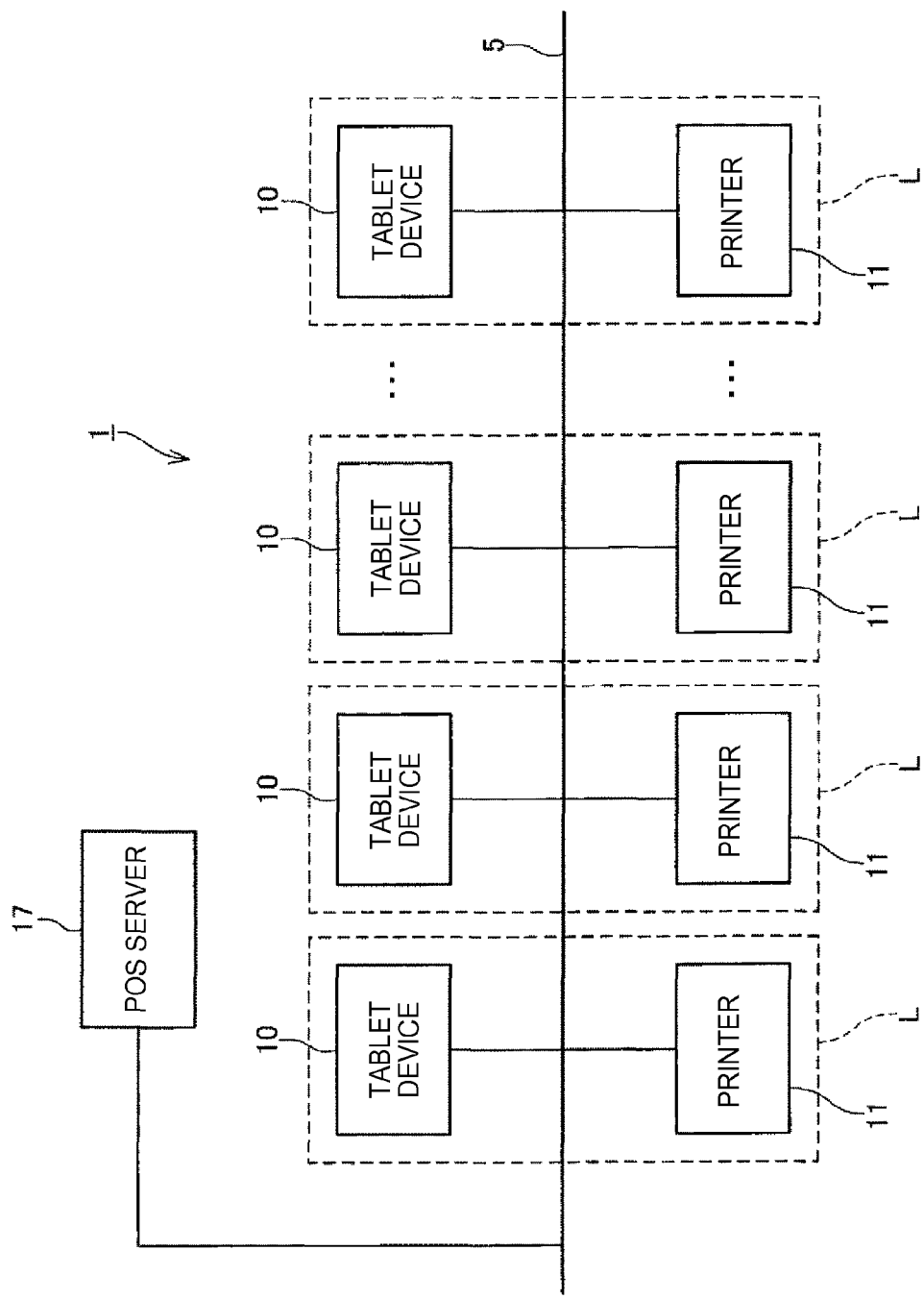
FIG. 1 schematically shows the configuration of a control system according to a first embodiment of the invention.

FIG. 1 is a block diagram showing the configuration of a control system 1 according to a first embodiment of the invention.

The control system 1 is part of a POS system used in a retail store in a shopping center or department store to manage product sales, product inventory, and sales trends in the store, for example, and at least has functions for processing sale transactions based on the products purchased by a customer, and producing receipts based on the payment received from the customer, at checkout counters L in the store.

A tablet device 10 (information processing device), and a printer 11 (recording device) connected to the tablet device 10, are installed at each of plural checkout counters L in a store where the control system 1 is used. The tablet device 10 and printer 11 are connected so that they data can be exchanged over wireless LAN 5 (network) conforming to the Ethernet (R) standard.

Figure 2:
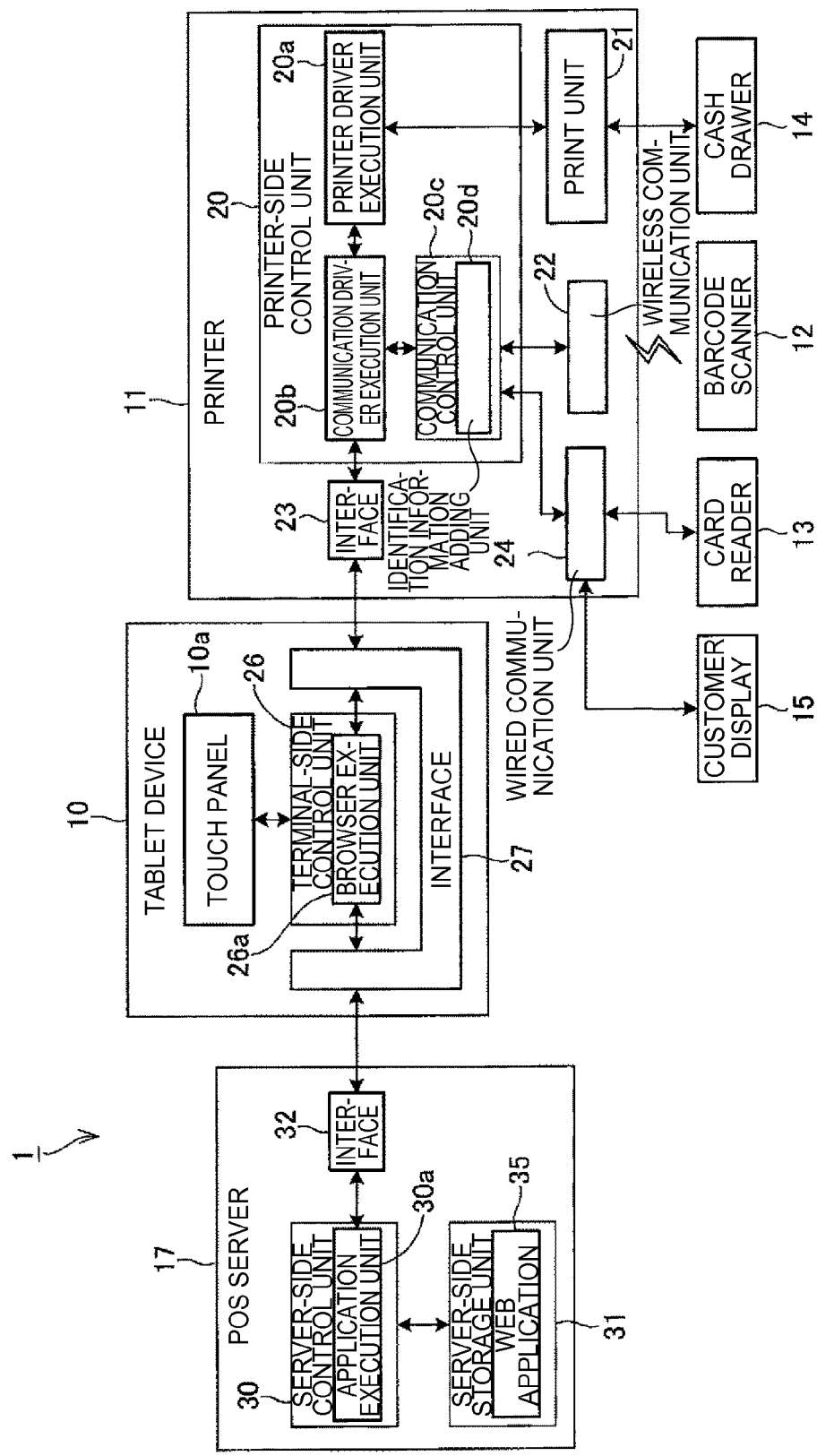
FIG. 2 is a block diagram showing the functional configuration of the control system.
Figure 3:
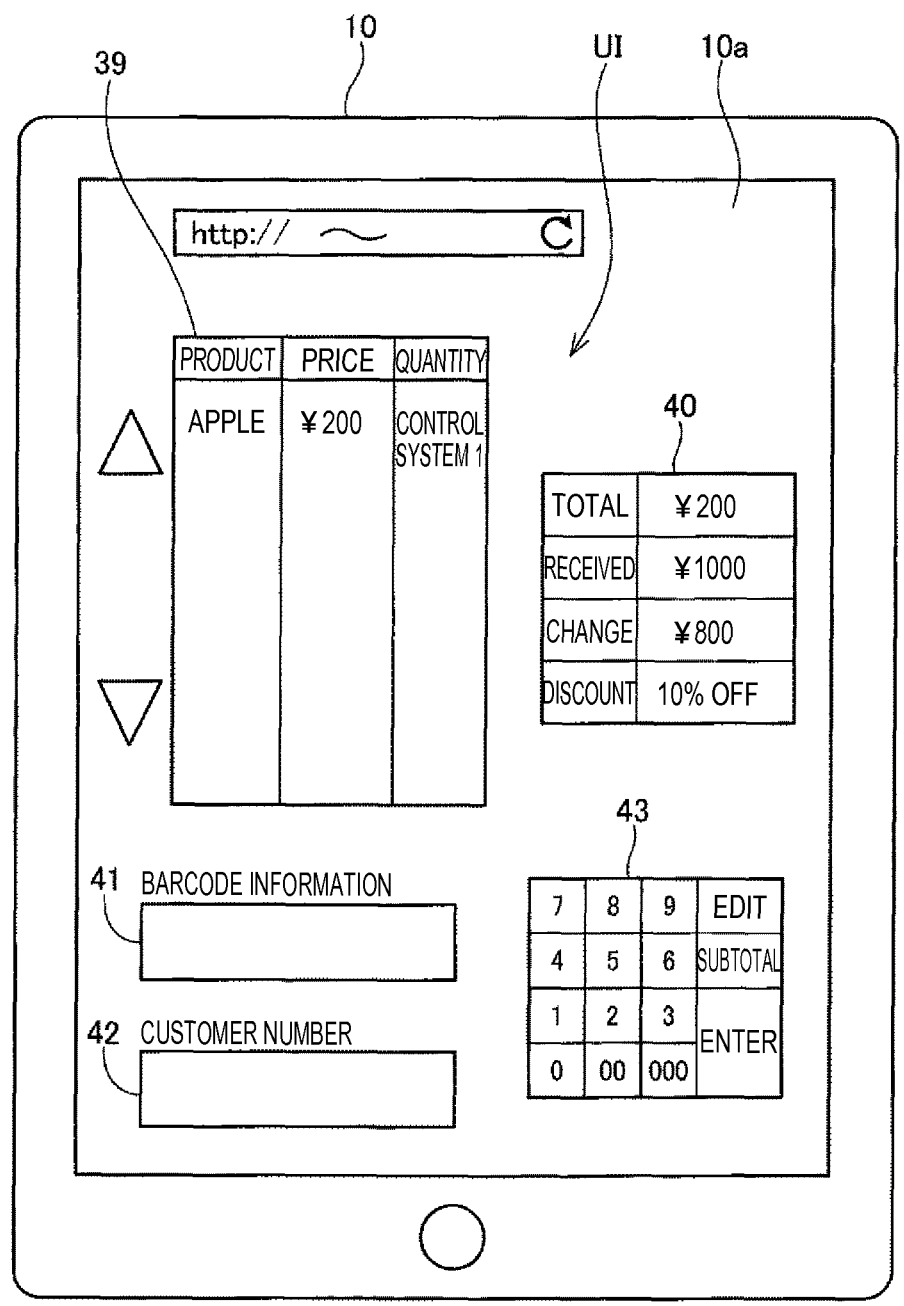
FIG. 3 shows a dedicated user interface displayed on a touch panel.

The tablet device 10 is a tablet computer. As shown in FIG. 2 and FIG. 3, the tablet device 10 in this embodiment has a touch panel 10a covering substantially the entire front surface, information is input by touching the touch panel 10a, and an external keyboard, display panel, or other device is not connected.

The printer 11 has at least the ability to produce receipts. Other external devices also connect to the printer 11. Examples of such external devices include a barcode scanner 12 (input device), card reader 13 (input device), cash drawer 14, and customer display 15 as shown in FIG. 2. The barcode scanner 12 reads barcodes on products or product packaging. The card reader 13 reads preferred customer cards, for example. The cash drawer 14 holds cash, checks, or other payment instruments. The customer display 15 displays transaction information for the customer. Of these external devices, the barcode scanner 12 and the printer 11 communicate by short-range wireless communication conforming to the Bluetooth (R) standard. The card reader 13 connects to the printer 11 by a USB cable or other wired communication cable, and communicates with the printer 11 according to a specific communication standard.

A POS server 17 (server) is connected to the wireless LAN 5. The POS server 17 stores various databases, and uses these databases to centrally manage the control system 1. The databases stored on the POS server 17 include a product management database, a sales management database, and an inventory management database. The relationship between the POS server 17 and the tablet device 10 is described below.

FIG. 2 is a block diagram schematically showing the functional configuration of the tablet device 10, the printer 11, and the POS server 17.

As shown in FIG. 2, the printer 11 includes a printer-side control unit 20, print unit 21, wireless communication unit 22, wired communication unit 24, and printer-side interface 23 (I/F).

The printer-side control unit 20 controls other parts of the printer 11. The printer-side control unit 20 includes a CPU, RAM, ROM, and other peripheral circuits. At least a printer driver that controls the print unit 21, and a communication driver that communicates with the tablet device 10 according to a specific standard, are installed on the printer 11. Function blocks of the printer-side control unit 20 include a printer driver execution unit 20a that runs the printer driver, and a communication driver execution unit 20b that runs the communication driver. The operation of these function blocks is further described below.

The print unit 21 produces a receipt by recording an image on roll paper and then cutting the roll paper. The print unit 21 includes a control circuit that controls the printing mechanisms. The print unit 21 also has a conveyance mechanism that conveys the roll paper in a specific direction, a recording mechanism that records images on roll paper with a recording head, and a cutting mechanism that cuts the roll paper. The printer-side control unit 20 (particularly the printer driver execution unit 20a) and the print unit 21 work together and function as a print unit that prints based on information sent from the information processing device.

The wireless communication unit 22 communicates with at least the barcode scanner 12 of the input devices by short-range wireless communication conforming to the Bluetooth standard. The wireless communication unit 22 includes a link manager, link controller, high frequency circuit, and antenna.

The communication control unit 20c, which is a function block of the printer-side control unit 20, reads and runs a so-called Bluetooth Driver Stack to control Bluetooth hardware. The communication control unit 20c controls the wireless communication unit 22 and communicates with the barcode scanner 12 by short-range wireless communication. The wireless communication unit 22 and the communication control unit 20c cooperate to function as a receiver unit that receives input information sent from an input device.

The wired communication unit 24 communicates by wire according to a specific communication protocol with at least the card reader 13 and customer display 15 of the input devices. The wired communication unit 24 may include a network card connected to a physical port. The communication control unit 20c of the printer-side control unit 20 controls the wired communication unit 24 to communicate by wire with the card reader 13 and customer display 15. The wired communication unit 24 and communication control unit 20c work together and function as a receiver unit that receives input information sent from an input device.

The communication control unit 20c has an identification information adding unit 20d. The identification information adding unit 20d is described further below.

The printer interface (I/F) 23 communicates with the tablet device 10 according to a particular communication standard as controlled by the printer-side control unit 20. The printer-side control unit 20 (particularly the communication driver execution unit 20b) cooperates with the printer-side interface 23 and functions as a transmitter unit that sends input information with identification information added thereto by a control unit to the information processing device.

As shown in FIG. 2, the tablet device 10 has a terminal-side control unit 26, a touch panel 10a, and a terminal-side interface (I/F) 27.

The terminal-side control unit 26 controls other parts of the tablet device 10. The terminal-side control unit 26 includes a CPU, ROM, RAM, and other peripheral circuits, and a browser execution unit 26a, which is a function block that runs a specific browser.

The touch panel 10a displays information on a display panel such as an LED panel as controlled by the terminal-side control unit 26. The touch panel 10a also detects touch operations on the display surface, and outputs to the terminal-side control unit 26.

The terminal-side interface 27 communicates according to a specific communication standard with the printer 11 and POS server 17 as controlled by the terminal-side control unit 26.

As shown in FIG. 2, the POS server 17 includes a server-side control unit 30, server-side storage unit 31, and server-side interface (I/F) 32.

The server-side control unit 30 controls parts of the POS server 17. The server-side control unit 30 includes a CPU, ROM, RAM, and a hard disk, EEPROM, or other nonvolatile memory device that stores data rewritably. The server-side interface 32 communicates with the tablet device 10 according to a specific communication protocol as controlled by the server-side control unit 30.

A web application 35 is stored so that it can be loaded from the server-side storage unit 31. The application execution unit 30a of the server-side control unit 30 is a function block that runs the web application 35. Functions of the web application 35 are described below.

The basic operation when devices in this control system 1 work together to execute a transaction process is described next.

The tablet device 10 executes the following process before the transaction process is performed.

The cash register operator or other responsible person first starts the browser of the tablet device 10 and performs an operation for displaying a dedicated user interface UI (user interface, see FIG. 3) on the touch panel 10a. In response to this command, the browser execution unit 26a of the terminal-side control unit 26 accesses a specific address on the POS server 17, acquires an HTML file (display file) for displaying the dedicated user interface UI, and displays the dedicated user interface UI based on the acquired file. A program with functions for executing transaction processes in conjunction with the application execution unit 30a of the POS server 17 is embedded in this HTML file written in a specific scripting language.

FIG. 3 shows an example of the dedicated user interface UI displayed on the touch panel 10a.

A display list area 39 for displaying the name, price, and quantity of the products purchased by the customer is presented in the top left part of the dedicated user interface UI shown in FIG. 3. Amount fields 40 for displaying and inputting the total of the products purchased by the customer, the amount of money received from the customer for the transaction, the amount of change due to the customer, and any discount applied to the transaction, are presented on the right beside the display list area 39.

Below the display list area 39 is a barcode data field 41 where the information represented by the barcode that is read with the barcode scanner 12 ("barcode information") is input and displayed. The barcode information is basically identification information uniquely assigned to each product type.

Below the barcode data field 41 is a customer number field 42, which is an input field where the customer number acquired by reading a frequent customer card is input and displayed when the card is read with the card reader 13.

A virtual keypad 43 is displayed on the right beside the barcode data field 41 and customer number field 42. Information can be entered using this virtual keypad 43 to the various fields displayed in the dedicated user interface UI, and the virtual keypad 43 has all keys required for data entry.

An address field 44 where the accessed address is displayed is presented at the top of the dedicated user interface UI.

Figure 4:
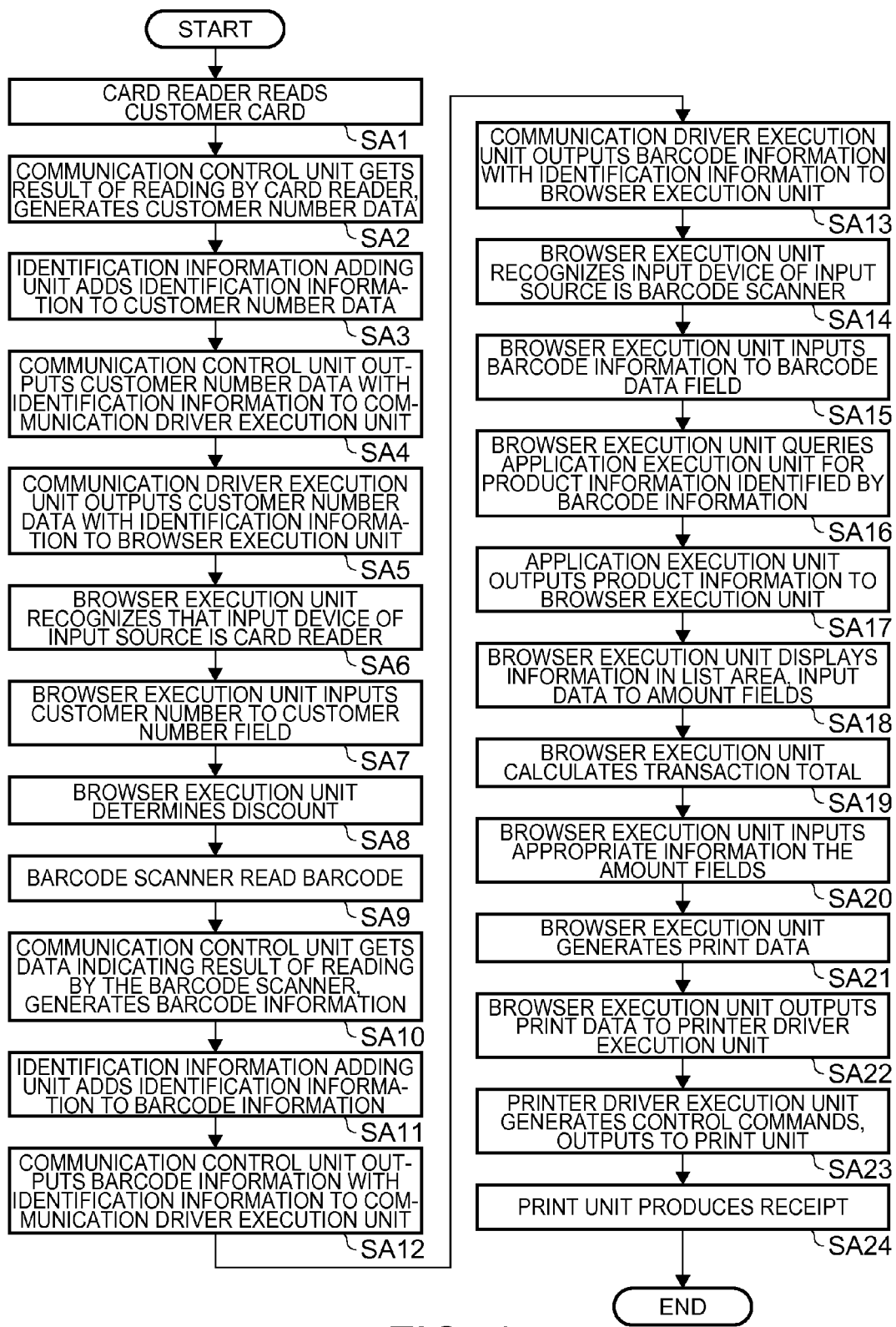
FIG. 4 is a flow chart of the operation of devices in the control system.

Operation when components of the control system 1 work together to process a transaction is described with reference to the flow chart in FIG. 4. The flow chart in FIG. 4 shows an example of the operation when a customer purchases one product. Note that for brevity the subject performing each of the steps of the process in the flow chart in FIG. 4 is not the same.

The following example also assumes that the customer has a customer card, and passes the customer card to the checkout clerk during the transaction at the checkout counter L. A customer number is recorded readably by the card reader 13 on the customer card, and a discount based on the customer number is given during the transaction process, for example.

At the checkout counter L, the checkout clerk reads the customer card of the customer with the card reader 13 (step SA1). The communication control unit 20*c* of the printer-side control unit 20 acquires data indicating the result of reading by the card reader 13 through the wired communication unit 24, and based on this data generates data indicating the customer number (step SA2). Next, the identification information adding unit 20*d* of the communication control unit 20*c* adds identification information identifying the card reader 13 to the data (input information) indicating the customer number (step SA3). In this embodiment the identification information adding unit 20*d* functions as a control unit that identifies the input device that sent the input information received by the receiver unit and adds identification information to the input information.

The identification information could be a vendor ID or product ID unique to the card reader 13, for example. When the port connected to a particular type of input device, for example, is fixed, information identifying the port could be used as the identification information. Regardless of what information is used as the identification information, that information is identical to the data or value managed as the identification information identifying the card reader 13 in the web application 35 (the data or value managed as the identification information identifying the card reader 13 in the dedicated script described below). In this embodiment, the relationship between the type of input device and the identification information is written in a configuration file the web application 35 can reference. The value of the identification information written in the configuration file can also be changed through a specific user interface, and the content of the configuration file can be rewritten by the operator whenever a new input device is connected to the printer 11. The identity of the identification information related to the type of one device in the web application 35 and the dedicated script described below, and the identification information added to the input information of the one input device by the identification information adding unit 20*d*, is assured.

The communication control unit 20*c* outputs data indicating the customer number with the identification information of the card reader 13 (below, customer number data with identification information) to the communication driver execution unit 20*b* (step SA4).

A function for outputting the customer number data with identification information to the browser execution unit 26*a* of the tablet device 10 is embedded in the communication driver installed in the printer 11. Using this function, the communication driver execution unit 20*b* outputs the customer number data with identification information to the browser execution unit 26*a* (step SA5).

When the customer number data with identification information is input, the browser execution unit 26*a* determines if the input device that input the data is the card reader 13 based on the identification information added to the customer number data with identification information (identification information for identifying the card reader 13 in this example) using a function of the program (referred to below as a dedicated script) embedded in the HTML file related to the dedicated user interface UI (step SA6).

The process of step SA6 is executed as follows. That is, the correlation between the identification information and the type of input device is written in the dedicated script, and a function for identifying the type of input device based on the identification information is embedded in the script. Using this function, the browser execution unit 26*a* determines if the input device that input the data is the card reader 13 based on the identification information added to the customer number data with identification information.

After the card reader 13 is identified as the input device of the input source, the browser execution unit 26*a* determines that the information denoted by the customer number data with identification information (=customer number) is information that should be input to the customer number field 42 because the input source is the card reader 13, and inputs the customer number to the customer number field 42 (step SA7). As a result, the customer number of the customer is displayed in the customer number field 42 of the dedicated user interface UI.

Because information identifying the input device is not added directly to the customer number data generated based on the output of the card reader 13, the type of input device that is the input source of the data cannot be determined based on that data. Therefore, when the customer number data is input from the printer 11 to the tablet device 10, the terminal-side control unit 26 could conceivably use a function embedded in the operating system of the tablet device 10 for detecting peripheral devices and connected devices to identify the input device of the input source.

In the control system 1 according to this embodiment of the invention, the tablet device 10 identifies the type of input device and executes a process appropriate to that device type using the foregoing means rendered by the cooperation of devices in the control system 1. As a result, using a function of the operating system of the tablet device 10 to determine the input device is not necessary. Furthermore, because the input device is identified and a process appropriate to the device type is executed without using a function of the operating system of the tablet device 10, different terminals can be used as the tablet device 10 independently of the type and version of the operating system, and the benefit of being able to use generic devices as the tablet device 10 can be effectively utilized.

Specifically, the tablet device 10 identifies the type of the source input device using a function of a dedicated script in this embodiment. As a result, by desirably using the ability to acquire an HTML file (display file) for the dedicated user interface UI and using a function of a program embedded in the display file, input devices can be identified and processes appropriate to the input device can be executed without using a function of the operating system.

The browser execution unit 26*a* determines that the type of input device of the input source is the card reader 13 in step SA6, and based on this result the browser execution unit 26*a* queries the application execution unit 30*a* to determine the discount (such as 10% off) to be applied to the transaction for the customer identified by the customer number contained in the customer number data with identification information (step SA8). Using the customer number as the search key, the application execution unit 30*a* accesses a specific database in response to the query, and identifies and returns the discount (such as 10% off) to be applied for the customer in that transaction. As will be understood below, a discount is then applied to the transaction based on the discount retrieved from the database.

Next, the checkout clerk reads the barcode from the one product purchased in the transaction with the barcode scanner 12 (step SA9). The communication control unit 20*c* of the printer-side control unit 20 then acquires data representing the result of reading with the barcode scanner 12 through the wireless communication unit 22, and based on this data generates data indicating the barcode information (step SA10). Next, the identification information adding unit 20*d* of the communication control unit 20*c* adds identification information identifying the barcode scanner 12 to the barcode information data (input information) (step SA11). The value of this identification information is the same as the data and value managed as the barcode scanner 12 identification information in the web application 35 and the dedicated script.

Next, the communication control unit 20*c* outputs the barcode information data with the added barcode scanner 12 identification information (below referred to as the barcode information data with identification information) to the communication driver execution unit 20*b* (step SA12). The communication driver execution unit 20*b* then outputs the barcode information data with identification information to the browser execution unit 26*a* (step SA13).

When the barcode information data with identification information is input, the browser execution unit 26*a* of the terminal-side control unit 26 of the tablet device 10 determines using a function of the dedicated script that the input device of the input source of the data is the barcode scanner 12 based on the identification information added to the barcode information data with identification information (identification information identifying the barcode scanner 12 in this example) (step SA14). This identification process is performed by the same means as in step SA6.

After determining that the input device of the input source is the barcode scanner 12, the browser execution unit 26*a* determines that the information denoted by the barcode information data with identification information (=barcode information) is information that should be input to the barcode data field 41 because the input source is the barcode scanner 12, and inputs the barcode information to the barcode data field 41 (step SA15). As a result, the barcode information displayed in the barcode data field 41 of the dedicated user interface UI.

Next, using a function of the dedicated script, the browser execution unit 26*a* communicates with the application execution unit 30*a* of the POS server 17 and requests the product name and price of the product identified by the barcode information (step SA16). When the query is received, the application execution unit 30*a* accesses the appropriate database and acquires the required information using a function of the web application 35, and outputs the acquired information to the browser execution unit 26*a* of the tablet device 10 (step SA17). Note that functions normally included in a so-called POS application, such as product search, sales management, and inventory management functions, are embedded in the web application 35. More specifically, in the control system 1 according to this embodiment of the invention, the POS application is not installed on the tablet device 10, and each tablet device 10 used in the store accesses the POS server 17 as needed and executes POS system processes using functions of the web application 35. As a result, the identity of the application executed by each tablet device 10 can be maintained, there is no need to upgrade the application on each tablet device 10 when the application is upgraded, for example, and ease of maintenance is thereby improved. There is also no need to provide special functions or connect special external devices to the tablet device 10, and a generic device having at least an installed browser can be used as the tablet device 10.

Next, the browser execution unit 26*a* of the tablet device 10 displays the name, price, and quantity of the product purchased by the customer in the display list area 39, and displays the total of the products purchased by the customer in a specific line in the amount fields 40, using functions of the dedicated script (step SA18).

Next, the checkout clerk executes an operation finalizing the products in the transaction using the virtual keypad 43. Triggered by this operation, the browser execution unit 26*a* calculates the total amount to be paid by the customer using a function of the dedicated script (step SA19). The transaction total is calculated as described below. Specifically, a function for calculating the transaction total reflecting the discount determined in step SA8 is included in the dedicated script. The browser execution unit 26*a* uses this function embedded in the dedicated script to calculate the transaction total.

After calculating the transaction total, the browser execution unit 26*a* inputs the calculated transaction total and information indicating the discount applied to the transaction in the appropriate fields of the amount fields 40, and displays the appropriate information in the appropriate fields of the amount fields 40 based on the amount received from the customer and the amount of change due, using a function of the dedicated script (step SA20).

Next, using a function of the dedicated script, the browser execution unit 26*a* generates information related to a receipt to be produced by the print unit 21 (below referred to as printing information) (step SA21). This printing information includes the text data to be recorded on the receipt, image data for the store logo, the locations of the text and images, information related to text attributes, and all other information required to record text and images and produce a receipt.

Next, the browser execution unit 26*a* outputs the generated printing information through the communication driver execution unit 20*b* of the printer 11 to the printer driver execution unit 20*a* according to a specific protocol (step SA22). Based on the input printing information, the printer driver execution unit 20*a* generates and outputs to the control circuit of the print unit 21 control commands conforming to the command language of the print unit 21 and causing the print unit 21 to execute the processes related to producing a receipt (step SA23). The control circuit of the print unit 21 then controls the printing mechanisms based on the control commands and produces a receipt (step SA24).

As described above, the control system 1 according to the first embodiment of the invention has an input device that reads and outputs data, a printer 11 (recording device) connected to the input device, and a tablet device 10 (information processing device) connected to the printer 11; and can process input information corresponding to an input device without the tablet device 10 identifying the input device because the printer 11 identifies the input device that output the data when data is output from an input device and outputs the data to the tablet device 19. As a result, processes appropriate to an input device connected to the printer 11 can be executed while using as few functions of the operating system of the tablet device 10 as possible.

When input is received from an input device in the control system 1, the printer 11 adds identification information identifying the input device of the input source to the input data, and outputs to the tablet device 10 (information processing device). When data related to input from an input device is input from the printer 11, the tablet device 10 identifies the type of the input device of the input source based on the identification information added to the data, and executes a process appropriate to the input device of the input source using a web application 35 that runs on the POS server 17. As a result, components of the control system 1 can cooperate to identify the input device and execute a process appropriate to the input device without using functions of the operating system of the tablet device 10.

The tablet device 10 also has a touch panel 10*a* that can display information, accesses the POS server 17, acquires an HTML file (display file) that displays a dedicated user interface UI for inputting information to the web application 35, and presents the dedicated user interface UI on the touch panel 10a using a function of a specific browser. The ability to identify the input device of the input source based on identification information, and the ability to execute processes corresponding to the input device of the input source using the web application 35, are achieved by a program (dedicated script) embedded in the HTML file.

This configuration can identify the input device and execute a process appropriate to the input device without using functions of the operating system by desirably acquiring an HTML file for a dedicated user interface UI and using functions of a program embedded in the HTML file.

When the input devices include a barcode scanner 12 and a card reader 13, and data related to input from the barcode scanner 12 or the card reader 13 is input, the printer 11 adds identification information for the barcode scanner 12 or identification information for the card reader 13 to the input data, and outputs to the tablet device 10. When data with identification information is input, the tablet device 10 determines whether the input device of the input source is the barcode scanner 12 or the card reader 13 based on the identification information, and using the web application 35, executes a process based on information indicating the result of barcode reading when the input device of the input source is the barcode scanner 12, and executes a process based on information indicating the result of reading a card when the input device of the input source is the card reader 13.

In a system such as this control system 1 that constitutes a POS system, the barcode scanner 12 and card reader 13 are generally connected to the printer 11, a product barcode is read by the barcode scanner 12 and a process based on the read barcode is executed, and a card such as a preferred customer card is read by the card reader 13 and a process based on the result of reading the card is executed. This configuration enables the tablet device 10 to determine if the input source of the input information is the barcode scanner 12 or the card reader 13, and execute processes appropriate to the detected device, while using as few functions of the operating system as possible.

Embodiment 2

A second embodiment of the invention is described next.

Figure 5:
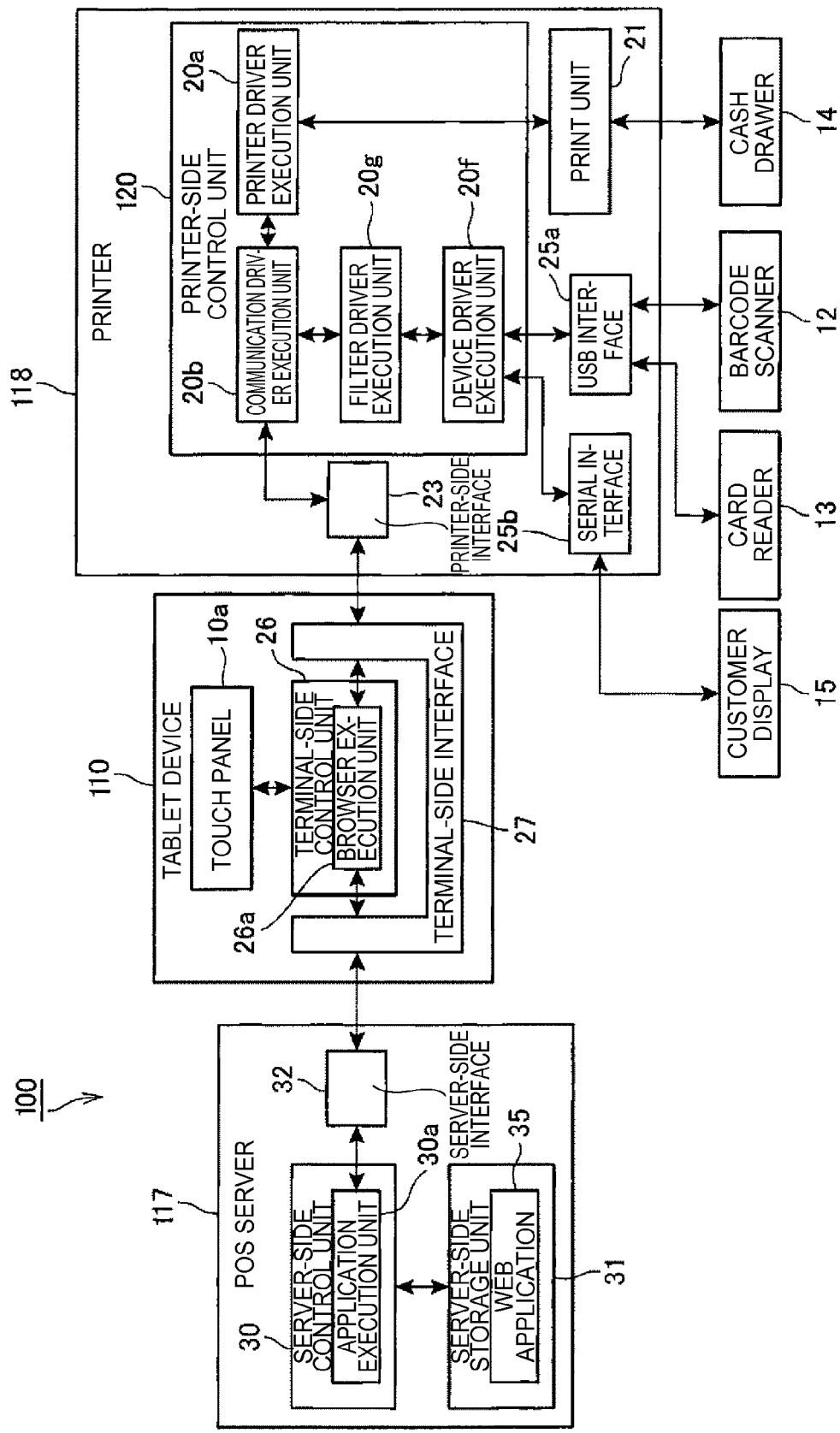
FIG. 5 is a block diagram showing the functional configuration of a control system according to a second embodiment of the invention.

FIG. 5 is a block diagram showing the functional configuration of a control system 100 according to the second embodiment of the invention. FIG. 5 schematically describes the functional configuration of the tablet device 110, printer 118, and POS server 117 in the control system 100.

The control system 100 is used in a store similarly to the control system 1 according to the first embodiment of the invention (FIG. 1), and has comparable functions as part of the POS system. The control system 100 has a tablet device 110 (information processing device) instead of the tablet device 10 in the control system 1, a printer 118 (recording device) instead of printer 11, and a POS server 117 (server) instead of POS server 17.

The tablet device 110 and POS server 117 differ respectively from the tablet device 110 and POS server 117 in the functions described with reference to FIG. 6, but other aspects of their configuration are the same. The printer 118 also differs from printer 11 in the function of the filter driver execution unit 20g, device driver execution unit 20f, USB interface 25a, and serial interface 25b. Other aspects of the configuration of the printer 118 are the same as printer 11.

Note that parts of the control system 100 that are the same in the control system 1 according to the first embodiment of the invention are identified by like reference numerals. Further description of these parts is omitted.

As shown in FIG. 5, the printer 118 has a USB interface 25a (input unit) and serial interface 25b in addition to the printer-side control unit 120, print unit 21, and printer-side interface 23.

Similarly to the printer-side control unit 20 (FIG. 2), the printer-side control unit 120 has a CPU, RAM, ROM, and other peripheral circuits. The printer-side control unit 120 controls other parts of the printer 118. Installed to the printer 118 are a printer driver that controls the print unit 21; device drivers for devices including the barcode scanner 12 and card reader 13 connected to the USB interface 25a; a device driver for the customer display 15 connected to the serial interface 25b; a communication driver that communicates with the tablet device 110 according to specific protocol; and an operating system (OS) that controls the printer 118 using functions of these driver programs. A filter driver that detects and acquires input data generated by a function of a device driver executed by the device driver execution unit 20f is also installed in the printer 118. The software configuration of the printer 118 is described below with reference to FIG. 6.

The printer-side control unit 120 includes a printer driver execution unit 20a, a communication driver execution unit 20b, a filter driver execution unit 20g that runs the filter driver, and a device driver execution unit 20f that runs the device drivers.

The USB interface 25a includes a plurality of USB connectors (not shown in the figure), and a USB host controller (not shown in the figure) that controls devices such as input devices through the USB connectors. The barcode scanner 12 and card reader 13 are each connected to a USB connector of the USB interface 25a. When the USB interface 25a detects that a device was connected to a USB connector, the USB interface 25a assigns identification information identifying the connected device, and reports detection of a connected device to the device driver execution unit 20f of the printer-side control unit 120. When a data output request is received from the barcode scanner 12 or card reader 13, the USB interface 25a receives the data output by the barcode scanner 12 or card reader 13 and outputs this data with the identification information to the device driver execution unit 20f in response to the data output request.

The USB interface 25a could acquire the vendor ID or product ID of the device connected to the USB interface 25a, and this vendor ID or product ID could be used as the identification information of the connected device (barcode scanner 12, card reader 13, or other). Alternatively, when unique identification information is assigned to each connector of the USB interface 25a, and a device is connected to the USB interface 25a, the identification information of the connector to which a device is connected could be used as the identification information of the device. Further alternatively, when connection of a device is detected by the USB interface 25a, and detection of the connection is reported to the device driver execution unit 20f, identification information for the device could be assigned by a function of the device driver execution unit 20f, and the assigned identification information stored by the device driver execution unit 20f and USB interface 25a.

The device driver execution unit 20f can run a USB device driver for each device class, including a mass storage class and HID (human interface device) class. When the printer driver execution unit 20a reports detecting a connection, the device driver execution unit 20f detects the class of the connected device, and uses the device driver for the detected class. For example, if a barcode scanner 12 or card reader 13 is connected to the printer driver execution unit 20a, the device driver execution unit 20f uses the HID class driver for the HID class. When a barcode is read by the barcode scanner 12, or when a card is read by the card reader 13, the USB interface 25a outputs the input data with the identification information to the device driver execution unit 20f. The device driver execution unit 20f acquires the input data and identification information that were input. Because the device driver execution unit 20f uses a USB device driver appropriate to each device class, the devices connected to the printer driver execution unit 20a are grouped by class, but the type of device is not identified. For example, the barcode scanner 12 and card reader 13 are both devices in the HID class. As a result, the device driver execution unit 20f processes data read by the barcode scanner 12 and card reader 13 in the same way as data input from an HID device.

The device driver execution unit 20f adds identification information for the device that input the data to data input from the USB interface 25a, and outputs to the operating system of the printer 118.

The filter driver execution unit 20g runs a program called a filter driver, which is software that controls a specific input/output device, and provides an abstract interface for a software application. A specific input/output device is a hardware device such as an expansion card or peripheral device, such as a graphics display, printer, or Ethernet (R) board. The filter driver execution unit 20g hooks and acquires the input data and identification information output by the device driver execution unit 20f to the operating system. If the acquired identification information satisfies a predetermined condition, the filter driver execution unit 20g sends the acquired identification information and input data through the printer-side interface 23 to the tablet device 110 by a function of the communication driver execution unit 20b.

When text data for display on the customer display 15 is input from the device driver execution unit 20f, the serial interface 25b outputs and displays the input text data on the customer display 15.

The printer-side interface 23 (I/F) communicates according to a specific communication protocol with the tablet device 110 as controlled by the printer-side control unit 120. The printer-side interface 23 functions as the communication driver execution unit 20b of the printer-side control unit 120 and an output unit.

As shown in FIG. 5, the tablet device 110 includes a terminal-side control unit 26, touch panel 10a, and terminal-side interface (I/F) 27. The tablet device 110 sends and receives data with the printer 118 and the POS server 117 by the terminal-side interface 27.

The POS server 117 includes the server-side control unit 30, server-side storage unit 31, and server-side interface 32. The POS server 117 exchanges data with the tablet device 110 through the server-side interface 32.

Figure 6:
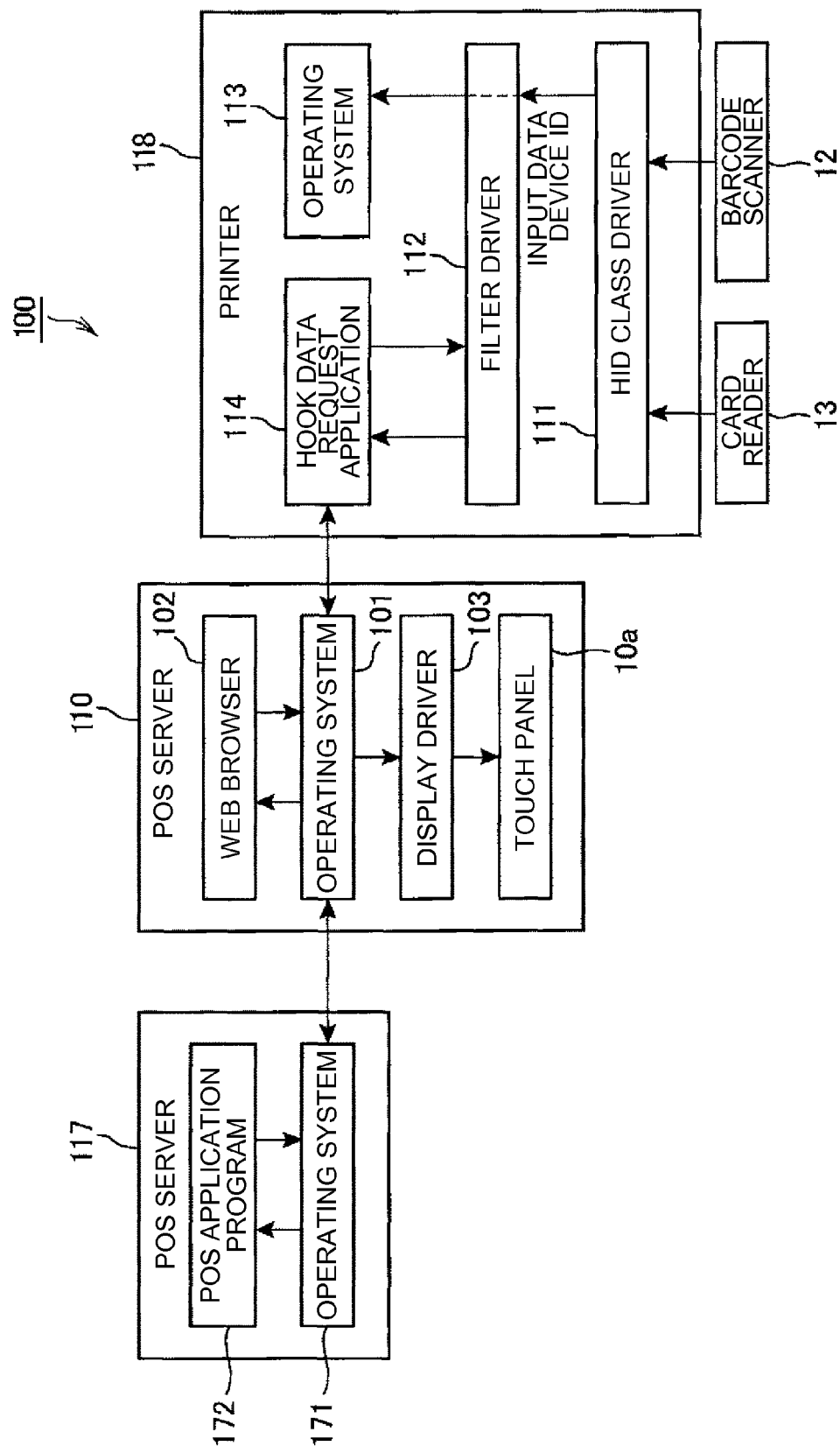
FIG. 6 schematically shows the software configuration of the control system.

FIG. 6 schematically shows the software configuration of the POS server 117, tablet device 110, and printer 118. Note that FIG. 6 schematically shows the software configuration of the devices, and there may other device functions that are embodied by software not shown in FIG. 6.

The POS server 117 has an operating system 171 run by the server-side control unit 30 (FIG. 5), and a POS application program 172 that runs on the operating system 171. The POS application program 172 is a program that is run by the application execution unit 30a (FIG. 5), and is stored as the web application 35 on the server-side storage unit 31 (FIG. 5).

The POS application program 172 is a program used when the control system 100 runs a process that manages a POS.

The POS application program 172 generates or reads from the server-side storage unit 31 (FIG. 5) data for a web page requested by the tablet device 110, and sends the data to the tablet device 110. When data requesting running the POS application program 172, and data that the POS application program 172 processes are sent from the tablet device 110, the POS application program 172 receives the data by a function of the operating system 171. The POS application program 172 executes a transaction process based on the data sent from the tablet device 110, and sends the result of the process to the tablet device 110.

The tablet device 110 has a operating system 101, a web browser 102, which is an application, that runs on the operating system 101, and a display driver 103 that controls the touch panel 10a as controlled by the operating system 101. The operating system 101 and display driver 103 are run by the terminal-side control unit 26 (FIG. 5) of the tablet device 110, and the web browser 102 is run by the browser execution unit 26a (FIG. 5).

The web browser 102 downloads a web page written in a scripting language or markup language such as HTML from the POS server 117. The downloaded web page data is stored, for example, in RAM not shown. The web browser 102 reads the data for the downloaded web page, and generates and outputs display data for displaying the web page to the operating system 101. The operating system 101 outputs the display data generated by the web browser 102 to the display driver 103, and the display driver 103 drives the touch panel 10a and displays a screen based on this display data.

When a script for running the POS application program 172 is embedded in the web page downloaded from the POS server 117, the web browser 102 runs the script and executes the POS application program 172 on the POS server 117.

When the operating system 101 detects a touch operation on the touch panel 10a, it gets the coordinates indicating for the location of the touch operation, identifies the content input by the touch, and outputs the content input by the touch to the web browser 102. The web browser 102 generates data for transaction processing based on the input content of the touch input from the operating system 101, sends the data to the POS server 117, and causes the POS application program 172 to execute a process based on the data. The web browser 102 receives the result of running the POS application program 172 from the POS server 117, and generates display data reflecting the received data.

If the barcode scanner 12 connected to the printer 118 reads a barcode, or the card reader 13 reads a magnetic card, and the data is input to the printer 118, the input data is input from the printer 118 to the tablet device 110. As described below, added to this data is identification information data for the device that input the data. The operating system 101 gets the input data and identification information input from the printer 118, and outputs to the web browser 102.

The web browser 102 sends the input data input from the operating system 101 with the identification information to the POS server 117 by a function of the operating system 101.

When device identification information is added to the input data sent from the tablet device 110, the POS application program 172 determines the type of device that input the input data based on this identification information. When the input data received from the tablet device 110 is data input from the barcode scanner 12 in this embodiment, the POS application program 172 processes this input data as data for the product code identifying a product purchased by a customer. When the input data received from the tablet device 110 is data input from the card reader 13, the POS application program 172 determines whether the data is data representing the customer number read from a customer's customer card, or is data representing the credit card used by the customer for payment. Customer number data and credit card data can be differentiated based on the number of data digits, whether a value at the beginning of the data is a particular value, or the status of the transaction process run by the POS application program 172, for example. Based on this decision, the POS application program 172 executes the transaction process using the input data received from the tablet device 110.

In addition to an operating system 113 run by the printer-side control unit 120, the printer 118 has an HID class driver 111 run by the device driver execution unit 20f (FIG. 5), and a filter driver 112 run by the filter driver execution unit 20g. The printer-side control unit 120 executes a hook data request application 114 that acquires data through the filter driver 112.

Of the devices connected to the USB interface 25a, the HID class driver 111 controls devices of the HID class, and outputs input data input from these devices to the operating system 113. The HID class driver 111 recognizes the type of device to be controlled as a HID device, and controls functions common to HID devices. More specifically, the HID class driver 111 polls devices controlled through the USB interface 25a at a regular interval, allows data transmission when there is a data transmission request from a controlled device, and acquires the input data output from that device. In this embodiment the barcode scanner 12 and card reader 13 are controlled by the HID class driver 111. Barcode data read by the barcode scanner 12, and card data acquired by the card reader 13 reading magnetic information from a card, are both output to the input interface of the operating system 113 as input data from an HID device. This input data is processed by the operating system 113 as input data related to a function of the printer 118, for example.

When data is input from an HID device, the HID class driver 111 outputs the identification information for the HID device that input the data together with the input data to the operating system 113. This identification information is as described above.

The input data and identification information output by the HID class driver 111 to the operating system 113 passes through the filter driver 112.

The filter driver 112 has a function for monitoring the data output by the HID class driver 111 to the operating system 113, and capturing input data meeting a predetermined condition. Because the data the HID class driver 111 outputs to the operating system 113 thus passes through the filter driver 112, the filter driver 112 captures all of the data the HID class driver 111 output, or at least the input data from the HID device, and determines if the device identification information added to the data meets the specified condition. The filter driver 112 outputs data containing device identification information satisfying the specific condition to the hook data request application 114.

The hook data request application 114 gets the input data input from the filter driver 112, and sends the input data together with the identification information added to the acquired input data to the tablet device 110. This input data and the identification information is received by the operating system 101 of the tablet device 110, and passed to the transaction process by a script run by the web browser 102.

If the input data output by the HID class driver 111 is data satisfying the specific condition, the filter driver 112 stops outputting this input data to the operating system 113. As a result, processing product barcode data input by the barcode scanner 12 and card data read from a magnetic card by the card reader 13 as data for another application can be prevented.

Figures 7A, 7B, 7C:
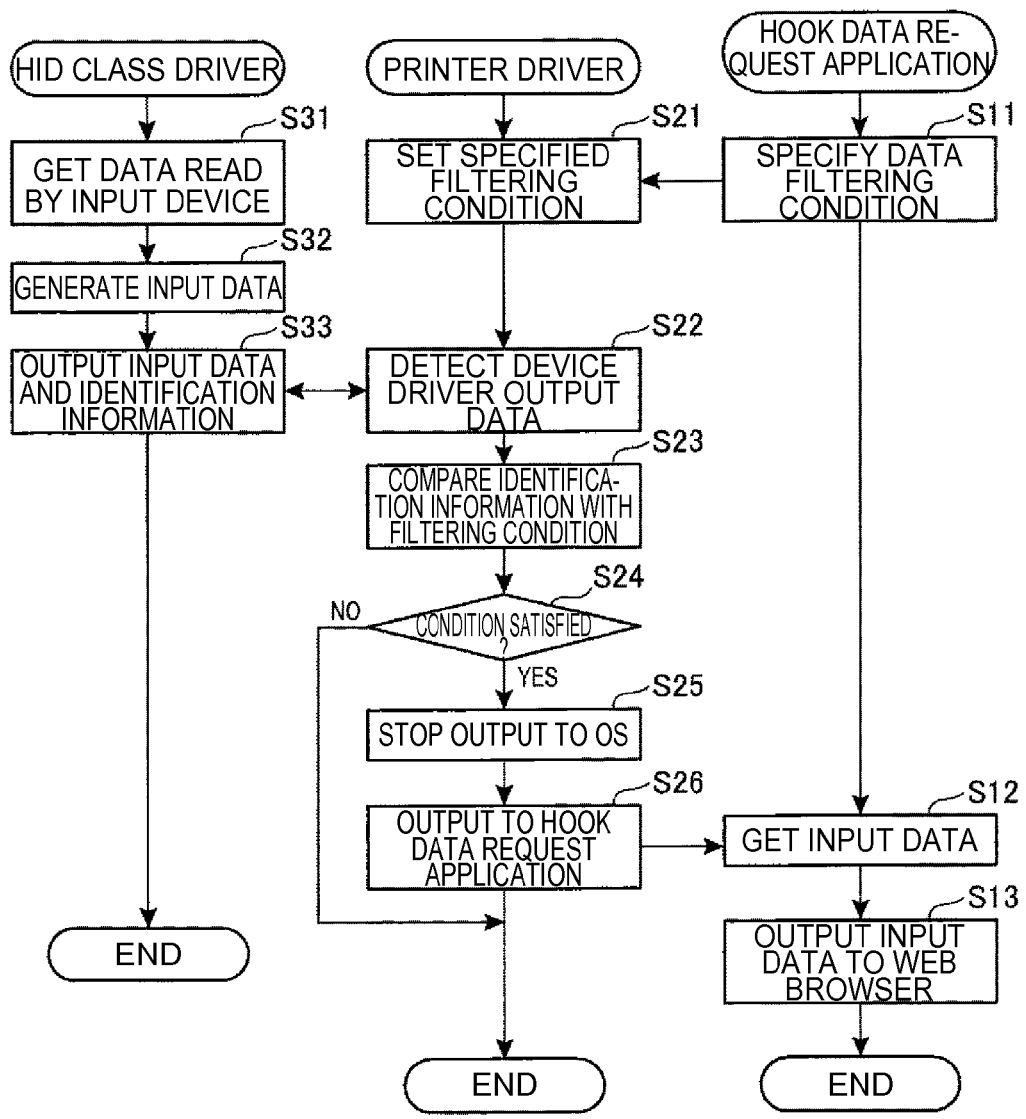
FIG. 7 is flow chart showing the operation of the printer.

FIG. 7 is a flow chart showing the operation of the printer 118, and more particularly showing the operation when data is input using the barcode scanner 12 and card reader 13. In FIG. 7, column (A) shows the operation of the device driver execution unit 20f that runs the HID class driver 111, (B) shows the operation of the filter driver execution unit 20g that runs the filter driver 112, and (C) shows the operation of the printer-side control unit 120 that runs the hook data request application 114.

Before the operation shown in FIG. 7 starts, the filtering condition, which is the condition for the filter driver 112 hooking the output data of the HID class driver 111, is set by the tablet device 110. More specifically, the filtering condition is set by a function of the POS application program 172, and this filtering condition is declared by the web browser 102 for the hook data request application 114.

The hook data request application 114 declares the filtering condition for the filter driver 112 (step S11 in FIG. 7 (C)), and the filter driver 112 sets the specified filtering condition (step S21 in FIG. 7 (B)). In this example, the filtering condition is identification information identifying which of the input devices connected to the printer 118 is the input device that input the transaction information used by the POS system.

When a barcode or card is then read by the barcode scanner 12 or card reader 13, and the USB interface 25a acquires and outputs the read data together with identification information to the HID class driver 111, the HID class driver 111 receives the read data and the identification information (step S31 in FIG. 7 (A)). The HID class driver 111 then generates input data for a device of the HID class based on the read data (step S32), and outputs the generated input data and identification information to the operating system 113 (step S33).

The filter driver 112 then detects the input data and identification information generated by the HID class driver 111 (step S22), and compares this identification information with the filtering condition set in step S21 (step S23). The filter driver 112 determines if the identification information satisfies the filtering condition (step S24), and if the filtering condition is met (step S24 returns YES), stops outputting the detected input data from the HID class driver 111 to the operating system 113 (step S25). Next, the filter driver 112 outputs the input data and identification information acquired from the HID class driver 111 to the hook data request application 114 (step S26). The hook data request application 114 gets the input data and identification information input from the filter driver 112 (step S12), and outputs to the web browser 102 (step S13).

If the input data and identification information generated by the HID class driver 111 do not satisfy the filtering condition (step S24 returns NO), the process ends. As a result, the input data and identification information are output to the operating system 113.

The operation shown in FIG. 7 results in the input data from the input device that was used to input the transaction information in the group of input devices connected to the printer 118 being input to the web browser 102.

The printer 118 has a generic device driver for each device class and differentiates the input devices connected to the printer 118 by device class, but does not further differentiate each device. The HID class driver 111 therefore outputs input data related to transaction information, and input data to be processed by the printer 118, such as configuration data related to the operation of the printer 118, to the operating system 113 in the same way. By detecting input data based on the specified filtering condition, the filter driver 112 that filters data output by the HID class driver 111 in this embodiment sends input data related to transaction information to the tablet device 110 and stops outputting the input data to the operating system 113. By reliably acquiring input data related to transaction information and processing the data by the POS application program 172, data related to transaction information is not supplied to an unexpected process. Furthermore, because this configuration does not use a dedicated device driver for each input device, and is achieved using a generic HID class driver 111, problems related to device driver management can be reduced.

Like the tablet device 10, the tablet device 110 displays a screen 4a such as shown in FIG. 3 on the touch panel 10a. With this screen 4a displayed, the user operating the tablet device 110 reads a customer card with the card reader 13, reads a product barcode with the barcode scanner 12, inputs amount information using the virtual keypad 43, and presses an enter key on the virtual keypad 43 to complete a transaction process at the checkout register. Like the tablet device 10, the tablet device 110 acquires data denoting the customer number read from the customer's customer card with the card reader 13, and product barcode data read with the barcode scanner 12, by a function of a script on a web page downloaded from the POS server 117. The tablet device 110 then displays the name, price, and quantity of the products purchased by the customer in the display list area 39, and displays the total of the purchased produces in a specific line of the amount fields 40.

Next, the user executes an operation finalizing the products in the transaction using the virtual keypad 43. Triggered by this operation, the tablet device 110 calculates the total amount to be paid by the customer using a function of a browser execution unit 26a script, and displays the transaction total in the appropriate line in the amount fields 40. When the user then receives payment from the user and inputs the amount received using the virtual keypad 43, the browser execution unit 26a calculates, and inputs and displays the amount of change due in the amount fields 40. Next, the browser execution unit 26a generates print data for printing a receipt, and sends the data to the printer 118. The printer driver execution unit 20a of the printer 118 then controls the print unit 21 and prints a receipt according to the print data input from the tablet device 110.

The control system 100 thus functions as a POS system using functions of a web application 35 by the tablet device 110 downloading a web page from the POS server 117, displaying a screen 4a, and running scripts. As a result, there is no need to install a so-called POS application on the tablet device 110. This configuration enables maintaining the identity of the application executed by each tablet device 110, eliminates the need to upgrade the application on each tablet device 110 when the application is upgraded, and improves ease of maintenance. There is also no need to provide special functions or connect special external devices to the tablet device 110, and a generic device having at least an installed browser can be used as the tablet device 110.

A control system 100 according to the second embodiment of the invention includes a tablet device 110 that runs a POS application program 172 to process transaction information by a function of a web browser 102; a barcode scanner 12 and card reader 13 as input devices that output data; and a printer 118 that connects to these input devices. The printer 118 includes a serial interface 25b and a USB interface 25a to which data input from the input devices is input; a printer-side control unit 120 that runs a HID class driver 111 to generate input data based on output from the input devices, and runs a filter driver 112 that acquires the input data and device information identifying the input device corresponding to the input data; a printer-side interface 23 that outputs the data acquired by the filter driver 112 to the tablet device 110; a print unit 21 that prints; and a communication driver execution unit 20b (communication unit) that communicates with the tablet device 110; and prints by the print unit 21 as controlled by the tablet device 110.

Thus comprised, the POS application program 172 can process input data from each input device based on the input device class using a generic HID class driver 111 even if each input device is identically processed as a device of the HID class, for example. As a result, input data related to transaction information can be appropriately processed by a POS system. By using a HID class driver 111, which is a generic device driver, problems managing device drivers can be reduced and input devices can be efficiently controlled.

Furthermore, because the tablet device 110 has a web browser 102 that downloads and runs a web page that runs a POS application program 172 from a POS server 117, and generates a display screen based on the downloaded web page, and a touch panel 10a that displays a screen generated by the web browser 102, the control system 100 can be used as a POS system as a result of the web browser 102 processing a web page even when the tablet device 110 does not have an environment that can independently and directly run a POS application program.

The data output by at least part of the input devices connected to the printer 118, specifically the barcode scanner 12 and card reader 13, is transaction information or data related to transaction information, and the tablet device 110 processes the transaction information by the POS application program 172 based on input data generated according to the output of the input device and the type of input device that input the input data. As a result, the tablet device 110 can receive transaction information input by plural different types of input devices, and process the transaction information as a POS system.

Furthermore, because the filter driver 112 extracts input data meeting a filtering condition specified by the POS application program 172, the tablet device 110 and printer 118 do not need the ability to manage the filter driver 112. As a result, a generic terminal can be used for the tablet device 110. In addition, the filtering condition can be simply changed by the POS application program 172 to change the input device used to input the transaction information, and there is no need to change the software of the tablet device 110 or printer 118. As a result, managing the software for the input devices is even easier.

The foregoing embodiments describe specific examples of the invention, but the invention can be desirably modified and adapted without departing from the scope of the accompanying claims.

For example, the operation of differentiating the input devices, and an operation based on the type of input device, are described in the foregoing embodiments using a barcode scanner 12 and card reader 13 as examples, but the types of input devices are not limited to these devices. More specifically, the invention can be widely applied to systems in which input devices are connected to a recording device, and differentiating the input devices is necessary.

Yet further, the print unit 21 has a function that adds identification information in the foregoing embodiments, but the object in which this function is rendered is not limited to the print unit 21, and could be any desirable software object or circuit in the printer 11. The foregoing embodiments describe examples in which the control system 1 according to the invention is applied to a POS system, but the invention is not limited to use in a POS system.

The function blocks shown in FIG. 2 and FIG. 5 can also be achieved by the cooperation of hardware and software, and do not suggest a specific hardware configuration. Hardware configurations running the software of the devices shown in FIG.

6 are also not limited by the content of FIG. 5 and FIG. 6 or the description of the foregoing embodiments.

Operations including the operations described in the flow charts shown in FIG. 4 and FIG. 7 can also be achieved by the devices running an appropriate program stored on an external storage medium.

The invention claimed is:

1. A control system comprising:
   a first input device configured to read and output first transaction information;
   a second input device configured to read and output second transaction information;
   a recording device storing first and second identification information, configured to receive the fret and second transaction information, add the first and second identification information to the first and second transaction information respectively, and output first and second data related to the first and second transaction information and the first and second identification information respectively;
   an information processing device configured to receive the first and second data front ate recording device and download a display file from a server and execute a program embedded in the display file to display the first and second transaction information on first and second field of the information processing device based on the first and second identification information respectively:
   wherein:
   the information processing device runs a point-of-sale (POS) application configured to processed the first and second data related to the first and second transaction information based on the first and second identification information respectively; and
   the recording device has:
      an input unit that connects to the first sand second input devices and receives the first and second transaction information:
      a control unit configured to:
         run a device driver to generate the first and second data based on the first and second transaction information respectively, and run a filter driver to acquire the first and second identification information identifying the first and second input devices that output the first and second data respectively, and
         add the acquired first and second identification information to the first and second data respectively:
      an output unit configured to output the first and second data and the first and second identification information; and
      a print unit that prints controlled by the information processing device.

2. The control system described in claim 1, the server connected to the information. processing device through a network;
   the information processing device is configured to:
   access the server;
   acquire first and second display files that displays information based on the first and second data respectively;
   display a user interface based on the first and second display files using a web browser;
   identify the first and second input devices based on the identification information; and
   execute by running a program embedded in the display file, the program identifies the first and second input devices based on the identification information and the program executes a process appropriate to the first and second input devices.

3. The control system described in claim 1, wherein
   the first and second input devices are a barcode seamier and a card reader respectively.

4. The control system described in claim 1, wherein the filter device acquired the first and second data satisfying a condition specified by the POS application after the first and second data is produced by the device driver.

5. The control system described in claim 1, wherein
   the server stores the display file that includes third and fourth identification information, the third identification information being related to the first identification information, the fourth identification information being related to the second identification information, the program being executed by matching the first and second identification information with the third and fourth identification information respectively.

6. A control method of a control system including a first and second input devices, a recording device connected to the fit and second input devices, an information processing device connected to the recording device, the control method comprising:
   reading first and second transaction information to the first and second input devices respectively;
   outputting the first and second transaction information from the first and second input devices to an input unit of the recording device respectively;
   running a device driver unit of the recording device to generate first and second data based on the first and second transaction information respectively;
   running a filter driver of the control unit f the recording device to acquire first and second identification information and identifying the first and second input devices by the recording device, the first and second identification information being registered in the recording device;
   running a filter driver of the control unit of the recording device to acquire first and second identification information and identifying the first and second input devices by the recording device, the first and second identification information being registered in the recording device;
   adding the first and second identification information for the first and second input devices to the first and second data respectively related to the first and second transaction information by the recording device after the identifying the first and second input devices;
   outputting the first and second data and the first and second identification information to the information processing device from the recording device;
   running a point-of-sale (POS) application by the information processing device to process the first and second data related to the first and second transaction information based on the first and second identification information respectively after outputting the first and second data to the information processing device;
   downloading a display file from a server and execute a program embedded in the display file; and
   displaying first and second information on first and second fields of the information processing device respectively using the program, the first and second information being related to the first and second transaction information respectively, the first and second fields being determined based on the first and second identification information respectively,
   wherein the recording device includes a print unit that prints controlled by the information processing device.

7. The control method of a control system described in claim 6, further comprising:

identifying the first and second input devices based on the first and second identification information respectively by the information processing device; and processing the first and second data appropriately to the first and second input devices respectively by the information processing device after the identifying the first and second input device by the information processing device.

8. The control method of a control system described in claim 6 further comprising:

outputting first and second data processed by the POS application to the recording device; and printing from the recording device, the first and second data processed by the POS application.

* * * * *